June 30, 1931.          W. DORN          1,812,517
              BATTERY IGNITION APPARATUS
                  Filed June 23, 1930
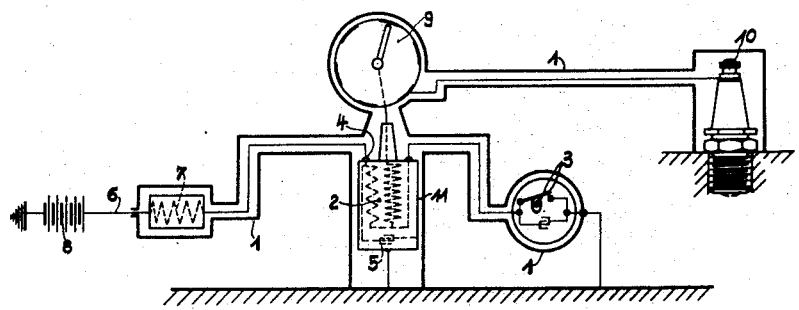
Inventor
Walter Dorn
by Steurad + McKay
his attorneys Patented June 30, 1931

1,812,517

UNITED STATES PATENT OFFICE

WALTER DORN, OF STUTTGART, GERMANY, ASSIGNOR TO ROBERT BOSCH AKTIENGESELLSCHAFT, OF STUTTGART, GERMANY

BATTERY IGNITION APPARATUS

Application filed June 23, 1930, Serial No. 463,225, and in Germany July 4, 1929.

The present invention relates to battery ignition apparatus and more particularly to screened apparatus.

As is known, the ignition devices of internal combustion engines cause considerable interference during the reception of wireless messages, especially when both the ignition and wireless apparatus operate in adjacent regions. This interference is particularly noticeable, in connéction with aircraft. All parts of the ignition apparatus are therefore screened against the radiation of disturbing waves by an earthed, good conducting metallic coating. Special steps must be taken in battery ignition because other apparatus than the ignition apparatus is connected to the battery are thus connected through this to the ignition apparatus and high frequency oscillations can on that account pass over them as experiments have proved. The battery cable and thus the battery are therefore, preferably protected against the occurrence of oscillations, whilst according to the invention that end of the induction coil which is connected to the battery through a series resistance, is earthed through a condenser, and the series resistance is used at the same time as a high frequency choke. By this arrangement, the greater part of the oscillations proceeding from the coil are conducted away to earth through the condenser whilst the remainder is entirely consumed in the series resistance acting in its usual construction as a high frequency choke. A special choke is, therefore, saved by the present invention.

One form of construction of the invention is shown by way of example in the accompanying drawing.

The whole ignition arrangement is enclosed on all sides in an earthed metal covering. Within this covering is the induction coil 2 which is preferably enclosed together with the condenser 5 in an earthed metal casing 11. This prevents high frequency waves from proceeding outwards somewhere on the lead from the condenser to the coil. The end 4 of the primary coil nearest the battery is connected through the condenser 5 to the earthed metal casing 11. The usual connection leads pass from the ignition coil to the interrupter 3, the series resistance 7 and the distributor 9, from which lead the ignition cables to the sparking plugs. The connection leads and the ignition cables are placed in metal tubes which form a part of the metal cover 1. The series resistance 7 which lies between the primary coil and the battery cable 6 of the battery 8 acts ohmically as well as inductively through this arrangement. Its inductive action helps to lead off high frequency waves through the condenser 5 to earth.

I claim:

1. In a screened battery ignition apparatus which includes an induction coil connected through a series resistance to a battery and an earthed metallic screen extending around the apparatus, the provision of an earth connection from that end of said induction coil which is nearest the battery and a condenser in said earth connection.

2. In a screened battery ignition apparatus which includes an induction coil connected through a series resistance to a battery and an earthed metallic screen extending around the apparatus, the provision of an earth connection from that end of the primary of the induction coil which is nearest the battery and a condenser in said earth connection.

3. In a screened battery ignition apparatus which includes an induction coil connected through a series resistance to a battery and an earthed metallic screen extending around the apparatus, the provision of an earth connection from that end of the primary of the induction coil which is nearest the battery and a condenser in said earth connection, said series resistance serving also as a high frequency choke.

4. In a screened battery ignition apparatus which includes an induction coil connected through a series resistance to a battery and an earthed metallic screen extending around the apparatus, the provision of an earth connection from that end of the primary of the induction coil which is nearest the battery to said earthed screen and a condenser in said earth connection.

5. A battery ignition apparatus comprising in combination a primary and secondary induction coil, a sparking plug, a distributor connected intermediate of said sparking plug and said secondary soil, a contact breaker connected to the secondary and to earth, a condenser across said contact breaker, a battery connected at one end to earth and at the other end to the primary coil, a series resistance between the battery and primary coil, an earthed metallic screen enclosing said primary and secondary coils, said plug, distributor, contact breaker and said series resistance, an earth connection from that end of the primary coil nearest the battery and a condenser in said earth connection.

In testimony whereof I have hereunto affixed my signature.

WALTER DORN.